May 18, 1926.
M. BUCHHOLZ
1,585,014
PROTECTION OF LIQUID INSULATED APPARATUS
Filed Oct. 8, 1925
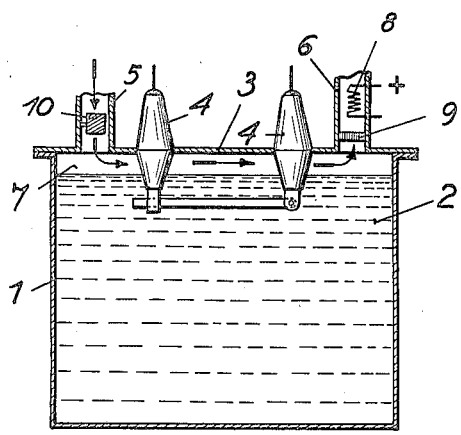
Inventor:
Max Buchholz
by
Atty.

Patented May 18, 1926.

UNITED STATES PATENT OFFICE.

MAX BUCHHOLZ, OF CASSEL, GERMANY.

PROTECTION OF LIQUID-INSULATED APPARATUS.

Application filed October 8, 1925. Serial No. 61,259.

My invention refers to the protection of liquid insulated electric apparatus against the destructive action of self-ignition or explosion of the gases and vapours of decomposition developed from the insulating liquid. It is an object of my invention to provide means whereby such ignition or explosion can automatically be prevented from taking place.

As is well known to those skilled in the art, the oil employed in the insulation of electric switches and other apparatus is likely, when these apparatus are operated or if one or the other part becomes defective or overloaded, to get decomposed and to develop gases and vapours which in their majority consist of hydrogen, methane and other gases which in contact with the oxygen of the air tend to be ignited or to explode. Besides the gases of decomposition there is formed soot which not only soils the oil but by mixing with air also facilitates sparking between the parts supplied with current which project above the oil or outside of the apparatus.

It has already been suggested to suck off the gases and vapours thus developed by creating above the surface of the oil a pressure below normal by means of an exhauster operated by the oil switch spindle. With an arrangement of this kind however a scavenging of the space above the oil surface will take place only whenever the oil switch is operated and it is not adapted for excluding all danger of an explosion. For a short single ventilation or scavenging will not suffice to remove all the gases developed. It further frequently happens that an oil switch is in constant operation during a period of six months and more without its parts being moved and in consequence thereof the gases which may have developed are not removed during this time so that the smaller defects or irregularities of working will cause the space above the oil level to be gradually filled with explosive gases. In consequence thereof, if by switching or in consequence of a more serious defect a spark is formed, the gases will ignite and cause an explosion.

All these drawbacks are obviated according to the present invention by keeping the air above the oil level in constant circulation, whereby the formation of explosive gas mixtures is obviated and at the same time the soot is removed which can either escape directly into the atmosphere or can be retained by a filter of wadding, shavings, glass wool, asbestos or the like. In order to keep the air circulating I may for instance resort to means for heating an air column communicating with the air space above the oil level.

In the drawings an oil switch embodying my invention is illustrated diagrammatically in vertical section by way of example.

In the drawings 1 is the top part of the casing or container and 2 is a body of insulating oil filling the greater part of the casing. 3 is the cover, 4, 4 are the insulators for the leading-in wires, 5 and 6 are two tubes on the cover 3 communicating with the space 7 above the oil level in the casing. 8 is a resistance wire mounted in the tube 6 and supplied with current from some suitable source and 9 is a filter disposed in the same tube below the heating device. 10 is a body consisting of or containing a substance capable of combining with the oxygen of the air.

By supplying the heating wire 8 with current the air in the tube 6 is heated and will cause a circulation of air in the space 7 above the oil in the direction of the arrows, the air entering through tube 5, giving off part or the whole of its oxygen, passing through the space 7, carrying along with it the gases or vapours which may have accumulated in the space, passing through the filter 9 which retains the soot and other solids and rising in the tube 6.

The resistance may be supplied expressly for the purpose in question or may be a normal resistance inserted in series or a shunt resistance. It may as well be replaced by a lamp, and the heat developed by this lamp will suffice to create an ascending air current in the tube 6, while, if this tube is made of glass, the lamp will at the same time illuminate the apparatus and the room in which it is mounted.

However instead of creating an air current by local heating, I may as well employ natural ventilation by mounting a tube 6 extending through the roof of the building and provided with a ventilating hood or the like. If ventilating means are provided for other purposes, the space above the oil in the apparatus may also communicate with these ventilating means.

If a plurality of apparatus shall be ventilated, a single ventilating device may serve for operating all of them.

I wish it to be understood that I do not desire to be limited to the exact details of construction shown and described, for obvious modifications will occur to a person skilled in the art.

I claim:—

1. The method of preventing accumulation of explosive gases and vapours above the liquid level of liquid insulated electric apparatus comprising causing a permanent circulation of the air above the liquid level in said apparatus.

2. Protective device for liquid insulated electric apparatus comprising means for causing a permanent circulation of the air in said apparatus above the liquid level.

3. Protective device for liquid insulated electric apparatus comprising heating means for causing a permanent circulation of the air in said apparatus above the liquid level.

4. Protective device for liquid insulated electric apparatus comprising heating and illuminating means for causing a permanent circulation of the air in said apparatus above the liquid level.

5. Protective device for liquid insulated electric apparatus comprising means for causing a permanent circulation of the air in said apparatus above the liquid level and means for retaining solid particles contained in the air.

6. Protective device for liquid insulated electric apparatus comprising means for causing a permanent circulation of the air in said apparatus above the liquid level and means for absorbing the oxygen in the air.

7. Protective device for liquid insulated electric apparatus comprising means for causing a permanent circulation of the air in said apparatus above the liquid level and means for absorbing the oxygen in the air and for retaining solid particles contained in the air.

In testimony whereof I affix my signature.

MAX BUCHHOLZ.